US011100098B2

(12) United States Patent
Bolsius et al.

(10) Patent No.: US 11,100,098 B2
(45) Date of Patent: Aug. 24, 2021

(54) SYSTEMS AND METHODS FOR PROVIDING MULTILINGUAL SUPPORT FOR DATA USED WITH A BUSINESS INTELLIGENCE SERVER

(75) Inventors: Roger Bolsius, Round Rock, TX (US); Raghuram Venkatasubramanian, Cupertino, CA (US); Ling Ni, Milpitas, CA (US); Donko Donjerkovic, Redwood City, CA (US); Saugata Chowdhury, Sunnyvale, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 145 days.

(21) Appl. No.: 13/038,252

(22) Filed: Mar. 1, 2011

(65) Prior Publication Data

US 2011/0295837 A1      Dec. 1, 2011

Related U.S. Application Data

(60) Provisional application No. 61/349,754, filed on May 28, 2010.

(51) Int. Cl.
    *G06F 16/245*    (2019.01)
(52) U.S. Cl.
    CPC .................... *G06F 16/245* (2019.01)
(58) Field of Classification Search
    CPC ................................................ G06F 17/30427
    (Continued)

(56) References Cited

U.S. PATENT DOCUMENTS 5,442,782 A * 8/1995 Malatesta ............. G06F 16/219
5,528,491 A   6/1996 Kuno
                  (Continued)

FOREIGN PATENT DOCUMENTS

JP    H05-233696 A    9/1993
JP    H10232883       9/1998

OTHER PUBLICATIONS

Stober, D., Fueling the Workflow Engine, Intermountain Healthcare, OAUG Forum at Collaborate 2008, http://idealpenngroup.tripod.com/sitebuildercontent/OAUG2008/Collaborate20Collaborate07/pdfs/dstober_wp.pdf [retrieved on Jul. 12, 2011], pp. 1-67.
                  (Continued)

*Primary Examiner* — Boris Gorney
*Assistant Examiner* — Griselle C Roland
(74) *Attorney, Agent, or Firm* — Tucker Ellis LLP

(57) ABSTRACT

A business intelligence (BI) server is described that supports data and schemas stored in multiple languages. The BI server implements a lookup table and lookup function that allows users to work with queries in different languages. When the user logs in, a session object is created for the user, which maintains the state information. A session variable specifies the language currently being used by the user. The BI server can inspect this session variable to determine the language of the user and perform the lookup translations as necessary. For example, if the language used by the session is different from the language of the base table storing the necessary information, the BI server can perform a translation by invoking a lookup function. The execution of the lookup can include performing a join operation of the base table with the lookup table to yield a translated value requested by the query.

17 Claims, 5 Drawing Sheets

(58) Field of Classification Search
USPC .......................................................... 707/714
See application file for complete search history.

(56) References Cited

U.S. PATENT DOCUMENTS

| | | | |
|---|---|---|---|
| 5,787,410 A * | 7/1998 | McMahon | G06F 16/258 |
| | | | 707/760 |
| 5,805,832 A * | 9/1998 | Brown et al. | 711/1 |
| 6,018,742 A * | 1/2000 | Herbert, III | |
| 7,151,438 B1 | 12/2006 | Hall et al. | |
| 7,440,888 B2 * | 10/2008 | Chen et al. | 704/8 |
| 7,444,342 B1 | 10/2008 | Hall et al. | |
| 7,698,264 B2 | 4/2010 | Leikucs et al. | |
| 7,757,227 B2 * | 7/2010 | Duplessis et al. | 717/173 |
| 7,783,724 B2 | 8/2010 | Winter et al. | |
| 7,853,557 B2 * | 12/2010 | Schneider | G06F 9/454 |
| | | | 707/608 |
| 8,078,612 B2 * | 12/2011 | Francker et al. | 707/722 |
| 8,200,618 B2 | 6/2012 | Gibson et al. | |
| 8,234,298 B2 | 7/2012 | Winter et al. | |
| 2003/0056192 A1 | 3/2003 | Burgess | |
| 2004/0133417 A1 * | 7/2004 | Azuma | 704/8 |
| 2005/0044065 A1 * | 2/2005 | McArdle | 707/3 |
| 2006/0136309 A1 * | 6/2006 | Horn et al. | 705/26 |
| 2006/0149716 A1 * | 7/2006 | Polo-Malouvier | 707/3 |
| 2007/0250493 A1 * | 10/2007 | Peoples et al. | 707/4 |
| 2007/0250494 A1 * | 10/2007 | Peoples et al. | 707/4 |
| 2008/0059412 A1 * | 3/2008 | Tarin | G06F 16/283 |
| 2008/0189332 A1 | 8/2008 | Winter | |
| 2008/0249998 A1 * | 10/2008 | Dettinger | G06F 17/30401 |
| 2008/0288525 A1 | 11/2008 | Leikucs et al. | |
| 2008/0306923 A1 * | 12/2008 | Drissi et al. | 707/3 |
| 2009/0030915 A1 | 1/2009 | Winter et al. | |
| 2009/0119309 A1 | 5/2009 | Gibson et al. | |
| 2009/0125497 A1 * | 5/2009 | Jiang et al. | 707/4 |

OTHER PUBLICATIONS

Oracle Applications Internationalization Guide, Applications Technology Group, Aug. 9, 2006, http://www.soulcast.com/post/show/12554/Oracle-Applications-Internationalization-Guide [retrieved on Jul. 12, 2011], 24 pages.

European Patent Office, International Search Report and Written Opinion dated Aug. 2, 2011 for Application No. PCT/US2011/036294, 10 pages.

State Intellectual Property Office of the People's Republic of China, Search Report from Office Action dated Mar. 1, 2016 for Chinese Patent Application No. 201180026349.7; 2 pages.

State Intellectual Property Office of the People's Republic of Chinese, Chinese Search Report dated Jul. 6, 2015 for Chinese Application No. 201180026349.7, 2 pages.

\* cited by examiner

Base Table 300

| Key | Code | Description | Category_Code | Category |
|---|---|---|---|---|
| 1 | A123 | Bread | D45 | Groceries |
| 2 | B234 | Marmalade | D45 | Groceries |
| 3 | C345 | Milk | D45 | Groceries |

Lookup Table 302

| Key | Language_Key | Description | Category |
|---|---|---|---|
| 1 | DE | Brot | Lebensmittelgeschäft |
| 1 | IT | Pane | Drogheria |
| 2 | DE | Marmelade | Lebensmittelgeschäft |
| 2 | IT | Marmaleta di agrumi | Drogheria |
| 3 | DE | Milch | Lebensmittelgeschäft |
| 3 | IT | Latte | Drogheria |

FIGURE 3A

Base Table 302

| Key | Code | Description | Category_Code | Category |
|---|---|---|---|---|
| 1 | A123 | Bread | D45 | Groceries |
| 2 | B234 | Marmalade | D45 | Groceries |
| 3 | C345 | Milk | D45 | Groceries |

Lookup Table 306

| Field_Key | Value_Key | Language_Key | Translation |
|---|---|---|---|
| Description | A123 | DE | Brot |
| Description | A123 | IT | Pane |
| Description | B234 | DE | Marmelade |
| Description | B234 | IT | Marmaleta di agrumi |
| Description | C345 | DE | Milch |
| Description | C345 | IT | Latte |
| Category | D45 | DE | Lebensmittelgeschäft |
| Category | D45 | IT | Drogheria |

FIGURE 3B

SYSTEMS AND METHODS FOR PROVIDING MULTILINGUAL SUPPORT FOR DATA USED WITH A BUSINESS INTELLIGENCE SERVER

CLAIM OF PRIORITY

The present application claims the benefit of U.S. Provisional patent application No. 61/349,754, entitled "SYSTEMS AND METHODS FOR PROVIDING VALUE HIERARCHIES, RAGGED HIERARCHIES, SKIP-LEVEL HIERARCHIES, MULTILINGUAL DOUBLE COLUMN SUPPORT AND CUSTOM MEMBERS IN A BUSINESS INTELLIGENCE SERVER," by Roger Bolsius et al., filed on May 28, 2010, which is incorporated by reference herein in its entirety, including all Appendices filed therewith.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The current invention relates generally to business intelligence and in particular to providing multilingual support for data in the business intelligence server.

BACKGROUND

In recent years, business intelligence software has become increasingly utilized by large business enterprises and other organizations. Business intelligence provides current and historical views of business operations by analyzing internal, structured data and business processes of the organization. It is often used to create future models and predictions in order to support better business decision making. As such, business intelligence tools can lead to decreased costs and increased efficiency, productivity and profit margins for many companies.

Business intelligence is usually implemented as software and/or hardware tools that are used to collect and analyze data and to transform the raw data into meaningful and useful information used to enable more effective strategic, tactical, and operational insights and decision-making. As such, a typical business intelligence server relies on data that may reside in a variety of places, including but not limited to relational databases, online analytical processing (OLAP) tools, repositories and content management systems, application servers, as well as a number of other sources.

In a typical business intelligence (BI) server, data is collected from all (or some) of these data sources and placed into a (virtual or physical) data warehouse or data mart, where it can then be modeled and analyzed before being presented to the user. For example, one approach is to implement a physical layer within the business intelligence server, where data is modeled as a consolidated table that mirrors objects in the data source layer. An application developer can assemble these compound objects by hand, using a subset of the entities relevant to the domain; the synthesized objects can subsequently be imported into the business intelligence server's metadata and decomposed into dimensions and facts.

However, a number limitations and potential areas of improvement still exist in the field of modeling data within business intelligence servers. For example, it is frequently useful for users to work with queries across different languages. A user that is logging into the BI server in Japanese may have trouble specifying the filters for a query if the data columns are stored in English. In addition, columns that store certain large object types are often unsupported by databases in "group by" query clauses. Accordingly, it is desirable for a BI server to be able to support schemas containing multilingual data and to simplify the administration and improve query performance of multilingual lookup tables.

SUMMARY OF INVENTION

In accordance with various embodiments, multilingual double column support is provided for the BI server. The multilingual support allows the BI server to use a lookup table for storing translations of values stored in a base table. Queries that require multilingual data can then join the base table and the lookup table to obtain these translations.

In accordance with an embodiment, the BI server enables multilingual support by implementing a lookup table along with an associated lookup function that allows users to work with queries that use different languages. When the user logs into the BI server, a session object is created for the user, which maintains the state information for the user's session. One of such session's variables specifies the language currently being used by the user. In accordance with an embodiment, BI server can inspect this session variable to determine the language of the user and perform the lookup translations as necessary. For example, if the language used by the session is different from the language of the base table storing the necessary information, the BI server can perform a translation by invoking a lookup function. The execution of the lookup can include performing a join operation of the base table with the lookup table to yield a translated value requested by the query.

BRIEF DESCRIPTION OF THE DRAWINGS

FIG. 3A is an illustration of one lookup table implementation, in accordance with various embodiments of the invention.

FIG. 3B is an illustration of another lookup table implementation, in accordance with various embodiments of the invention.

DETAILED DESCRIPTION

Figure 1:
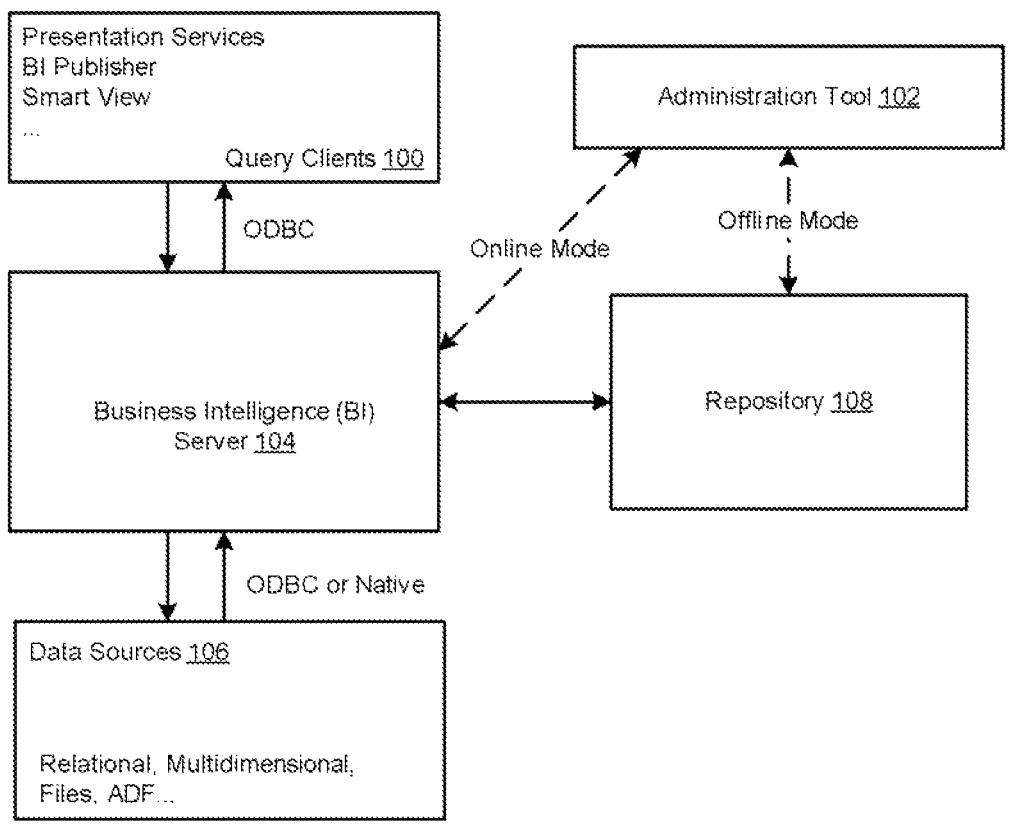
FIG. 1 is an illustration of the BI server in accordance with various embodiments of the invention.

The invention is illustrated by way of example and not by way of limitation in the figures of the accompanying drawings in which like references indicate similar elements. References to embodiments in this disclosure are not necessarily to the same embodiment, and such references mean at least one. While specific implementations are discussed, it is understood that this is done for illustrative purposes only. A person skilled in the relevant art will recognize that other components and configurations may be used without departing from the scope and spirit of the invention.

In the following description, numerous specific details are set forth to provide a thorough description of the invention. However, it will be apparent to those skilled in the art that the invention may be practiced without these specific details. In other instances, well-known features have not been described in detail so as not to obscure the invention.

In accordance with various embodiments described throughout this disclosure, a business intelligence (BI) server is extended with multilingual support for data queries. Business intelligence queries typically involve joining multiple tables. This presents various technical/performance/functional challenges. For example, 1) Users want to be able to create filters (Product='coke') in a manner that works for users across different languages. If the filter is expressed as 'Product=coke', this may not work for a Japanese user; 2) It is common for additional relevant data to be stored in database CLOB/BLOB columns (power point files, excel files, PDF files, patient x-rays etc.). Databases usually don't allow these columns to participate in 'group by'; and 3) Label localization needs typically require a table to be joined with multiple tables. But for any given query only one of these may be active. Additionally, the joins can be optimally done post-aggregation. The multilingual support feature allows the BI server to address these needs.

In accordance with an embodiment, the BI server enables multilingual support by implementing a lookup table along with an associated lookup function that allows users to work with queries that use different languages. When the user logs into the BI server, a session object is created for the user, which maintains the state information for the user's session. One of such session's variables specifies the language currently being used by the user. In accordance with an embodiment, BI server can inspect this session variable to determine the language of the user and perform the lookup translations as necessary. For example, if the language used by the session is different from the language of the base table storing the necessary information, the BI server can perform a translation by invoking a lookup function. If, on the other hand, the language of the session is the same as the language of the base table, then no translation is necessary and the query can be answered directly without any lookups.

In accordance with an embodiment, the lookup table includes at least one value column, which is the column containing the actual translation value of a column in a base table used to store the data. In addition, the lookup table has a lookup key (e.g. primary key) which will be used to perform the lookup.

In accordance with an embodiment, the lookup function includes a set of parameters that will be used to obtain the translation of a particular piece of data. For example, the lookup function includes a parameter specifying the value column of the lookup table that will contain the translation. In addition, the lookup function includes a parameter to specify the identifier of the data item and a parameter identifying the particular language needed for the translation (this can be obtained from the session variable). In some cases, the lookup function may also include a parameter to specify the column of the base table that stores the value in the base language for needed piece of data, as will be described in further detail below.

In accordance with an embodiment, the BI server rewrites the lookup function into an appropriate structured query language (SQL) statement that will be used to perform a join operation of the base table with the lookup table. The join operation yields a translated value (in the user's session language) for the row of the base table that is requested by the query.

FIG. 1 is an illustration of the BI server in accordance with various embodiments of the invention. Although this diagram depicts components as logically separate, such depiction is merely for illustrative purposes. It will be apparent to those skilled in the art that the components portrayed in this figure can be combined or divided into separate software, firmware and/or hardware. Furthermore, it will also be apparent to those skilled in the art that such components, regardless of how they are combined or divided, can execute on the same computing device or can be distributed among different computing devices connected by one or more networks or other suitable communication means.

As illustrated, the BI server 104 and the BI repository 108 provide a layer of abstraction that lets users 100 send simple logical structured query language (SQL) queries against complex federated data sources 106. In accordance with an embodiment, the BI server 104 processes user requests and queries underlying data sources. The BI server can maintain a logical data model and provide client access to this model through open database connectivity (ODBC).

In accordance with an embodiment, the BI server uses the metadata in the repository 108 to perform two tasks (1) to interpret logical SQL queries and write corresponding physical queries against the appropriate data sources 106; and (2) to transform and combine the physical result sets and perform final calculations. The BI server can connect to the underlying data source through either ODBC or over a native application programming interface (API) of the data source.

In accordance with an embodiment, the administration tool 102 is an application that can be used to create and edit the BI repository 108. The admin tool can connect to the repository in offline mode, or it can connect to the repository through the BI server (online mode). In accordance with various embodiments, the additional functionality provided by the BI server can be made available in the online mode.

Figure 2:
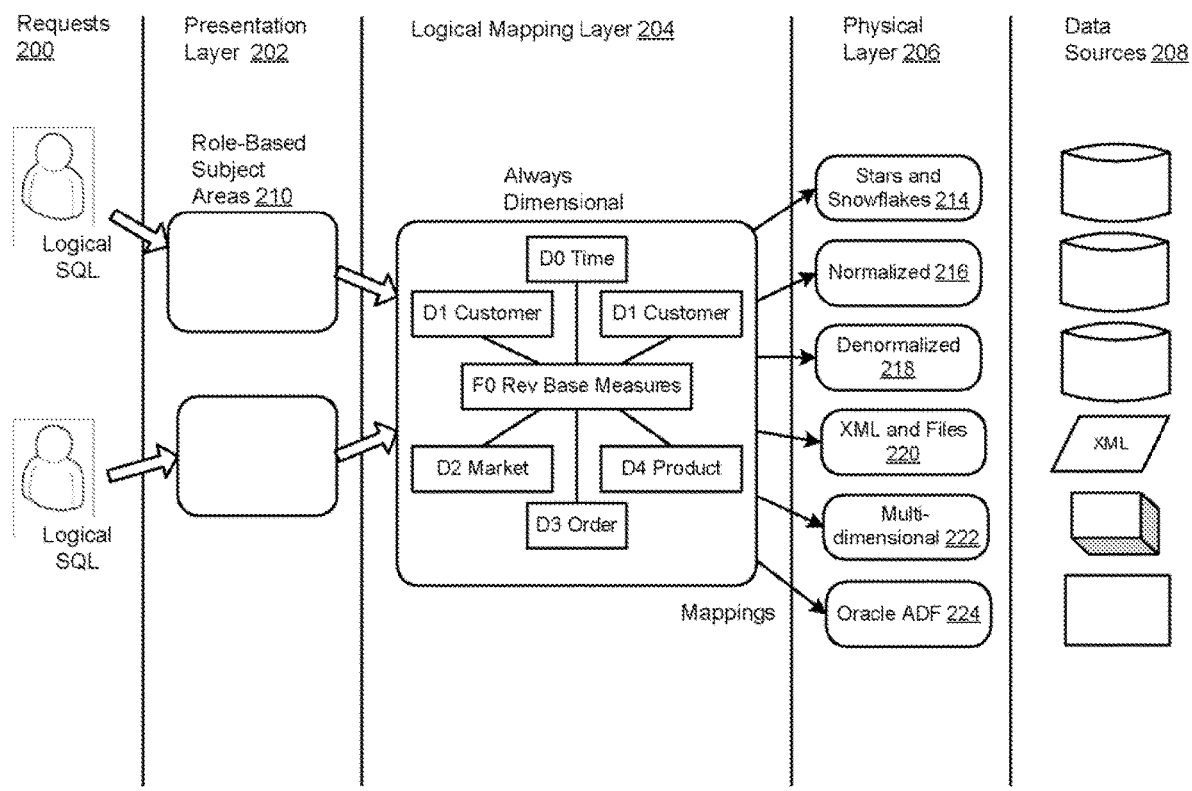
FIG. 2 is an illustration of a query traversing the layers of the BI repository in accordance with various embodiments of the invention.

FIG. 2 is an illustration of a query traversing the layers of the BI repository in accordance with various embodiments of the invention. Although this diagram depicts components as logically separate, such depiction is merely for illustrative purposes. It will be apparent to those skilled in the art that the components portrayed in this figure can be combined or divided into separate software, firmware and/or hardware. Furthermore, it will also be apparent to those skilled in the art that such components, regardless of how they are combined or divided, can execute on the same computing device or can be distributed among different computing devices connected by one or more networks or other suitable communication means.

As mentioned above, the BI server can process incoming client requests 200 that are sent against complex federated data sources. In accordance with an embodiment, the BI repository is comprised of three layers: the physical layer 206, the logical mapping layer 204 and the presentation layer 202.

In accordance with an embodiment, the physical layer 206 defines the objects and relationships the BI server needs to write native queries against each physical data source 208. In accordance with an embodiment, a user or administrator creates this layer by importing tables, cubes and flat files from the data sources. For example, as shown in this figure, some of the formats and schemas used in the physical layer can include stars and snowflakes 214, normalized 216 and de-normalized 218 data, extensible markup language (XML) and file storage data 220, multi-dimensional data 222, application development framework (ADF) data 224 and other formats. Separating the logical behavior of the application from the physical model provides the ability to federate multiple physical data sources to the same logical object, enabling aggregate navigation and partitioning, as well as dimension conformance and isolation from changes in the physical sources. This separation also enables the creation of portable BI applications.

In accordance with an embodiment, the logical business model and mapping layer 204 defines the business or logical model of the data and specifies the mapping between the business model and the physical schemas. This layer also determines the analytic behavior seen by users, and defines the superset of objects and relationships available to the users. It also hides the complexity of the source data models.

In accordance with an embodiment, the presentation layer 202 provides a way to present customized, secure, role-based views 210 of a business model to users. It adds a level of abstraction over the business model and mapping layer 204 and provides the view of the data seen by users building requests in the presentation services and other clients 200.

In accordance with an embodiment, a typical order for an enterprise to constructs a BI repository is to create the physical layer objects first, the logical model and mapping layer objects next and the presentation layer objects last. However, in alternative embodiments, the user can work on each layer at any stage.

In most cases, planning the business model is the first step in developing a usable data model for decision support. In a business model, a dimension represents a hierarchical organization of logical columns (attributes). One or more logical dimension tables can be associated with at most one dimension. Examples of common dimensions are time periods, products, markets, customers, suppliers, promotion conditions, raw materials, manufacturing plants, transportation methods, media types and time of day. In accordance with an embodiment, dimensions exist in the logical model and mapping layer 204 and in the presentation layer 202.

In each dimension, attributes can be organized into hierarchical levels. These logical levels represent the organizational rules and reporting needs required by the business of the organization deploying the BI server. They provide the structure (metadata) that the BI server uses to drill into and across dimensions to get more detailed views of data.

FIG. 3A is an illustration of one lookup table implementation, in accordance with various embodiments of the invention. It should be noted that the embodiments described herein are not necessarily limited to this particular implementation and that other implementations are possible within the scope of the present invention. In particular, this figure illustrates a design of the lookup table where one lookup table is maintained for each base table. In an alternative design illustrated in FIG. 3B, one lookup table can be maintained per each field of the base table, as will be described in further detail below.

As illustrated in FIG. 3A, there is a separate lookup table 302 per each base table 300. In accordance with an embodiment, the lookup table contains a foreign key reference to records in the base table and contains the values for each translated field in a separate column. Assuming a completely dense lookup table, the number of rows in the lookup table for a particular language is equal to the number of rows in the base table. In the example illustrated in FIG. 3A, each record in the lookup table 302 matches only one row in the base table 300.

FIG. 3B is an illustration of another lookup table implementation, in accordance with various embodiments of the invention. Once again it is noted that the embodiments described herein are not necessarily limited to this particular implementation and that other implementations of the lookup table are also possible.

As illustrated, an alternative design is to implement a separate lookup table 306 per each translated field of the base table 302. In accordance with an embodiment, getting the translated value of each field would then require a separate join to a lookup table. In practice, there is often just one physical table that contains translations for multiple fields. When a single table contains translations for multiple fields, it can be necessary to place a filter on the lookup table to restrict the data to just the values relevant to a particular column in the base table.

In accordance with various embodiments of the invention, the BI server can support both lookup table designs illustrated in FIG. 3A and FIG. 3B.

In accordance with various embodiments, both sparse and dense lookup tables can be supported by the BI server. In some schemas the lookup tables are sparse containing translations for only some of the records in the base tables. A sparse lookup table requires an outer join with the base table so that rows from the base table are preserved. Usually when the translation is missing for a particular record, the base translation should be substituted in place of a NULL value. A dense lookup table contains translations in all languages for every record in the base table. Since dense lookup tables contain a matching record for every base record, the lookup table can be inner joined with the base table, thereby avoiding the overhead of outer joins and base language substitution. In some cases, a lookup table can be both dense and sparse. For example, the lookup table in FIG. 3B may contain complete translation for 'Description' field but partial translation for 'Category' field. Thus, in accordance with an embodiment, the BI server treats "dense" and "sparse" as the property of lookup operation instead of being a property of the table. A sparse lookup will connect the base table with translation table with outer join, while a dense lookup will result in inner join between base table and translation table.

In accordance with an embodiment, descriptor columns can be supported by the BI server. Descriptor columns are columns that provide a textual description for some key column where there is a one-to-one relationship between the descriptor column and the key column. In practice the one-to-one relationship may often be not enforced, but for query purposes the columns can be treated as if there is such a one-to-one relationship.

An example of a descriptor column might be Product_Name, which provides textual descriptions for a Product_Key column. Although it is possible for two products to have the same name in many cases, this is not likely to occur, and even if there are products with the same name, the products can still be treated as separate entities in aggregations and filters.

In accordance with an embodiment, one reason for creating descriptor columns is to aid in defining language independent filters. When the user creates a filter based on a descriptor column, the query tool displays a list of values to the user that are selected the descriptor column. Internally, the BI server can also store the key column as hidden field in the LOV. When the user selects values from the LOV, the tool replaces the selected descriptor values in the filter with the hidden key values and rewrites the filter in terms of the key column. Since the filter is converted to a form that only references the non-translated key column, the filter is language independent and can be shared with users of other languages.

Although descriptor columns are often translated in to multiple languages, this is not necessarily required. A descriptor column may provide descriptions in just one language. The same filter conversion to key values described above applies equally to non-translated descriptor columns. This can ensure that rows that have different key values but that share the same textual description are treated separately when aggregating and filtering.

In accordance with an embodiment, this descriptor column technique is also useful when dealing with queries that involve large object (LOB) data types such as character large objects (CLOBs), binary large objects (BLOBs) and aggregate functions such as COUNT( ) or SUMO. Some data sources do not allow LOB columns to be used in the GROUP BY clause. So, instead of adding the LOB column to the GROUP BY it can be necessary to group by some other column that has a one-to-one relationship with the LOB column and then in join the LOB column after the aggregates have been computed.

Figure 4:
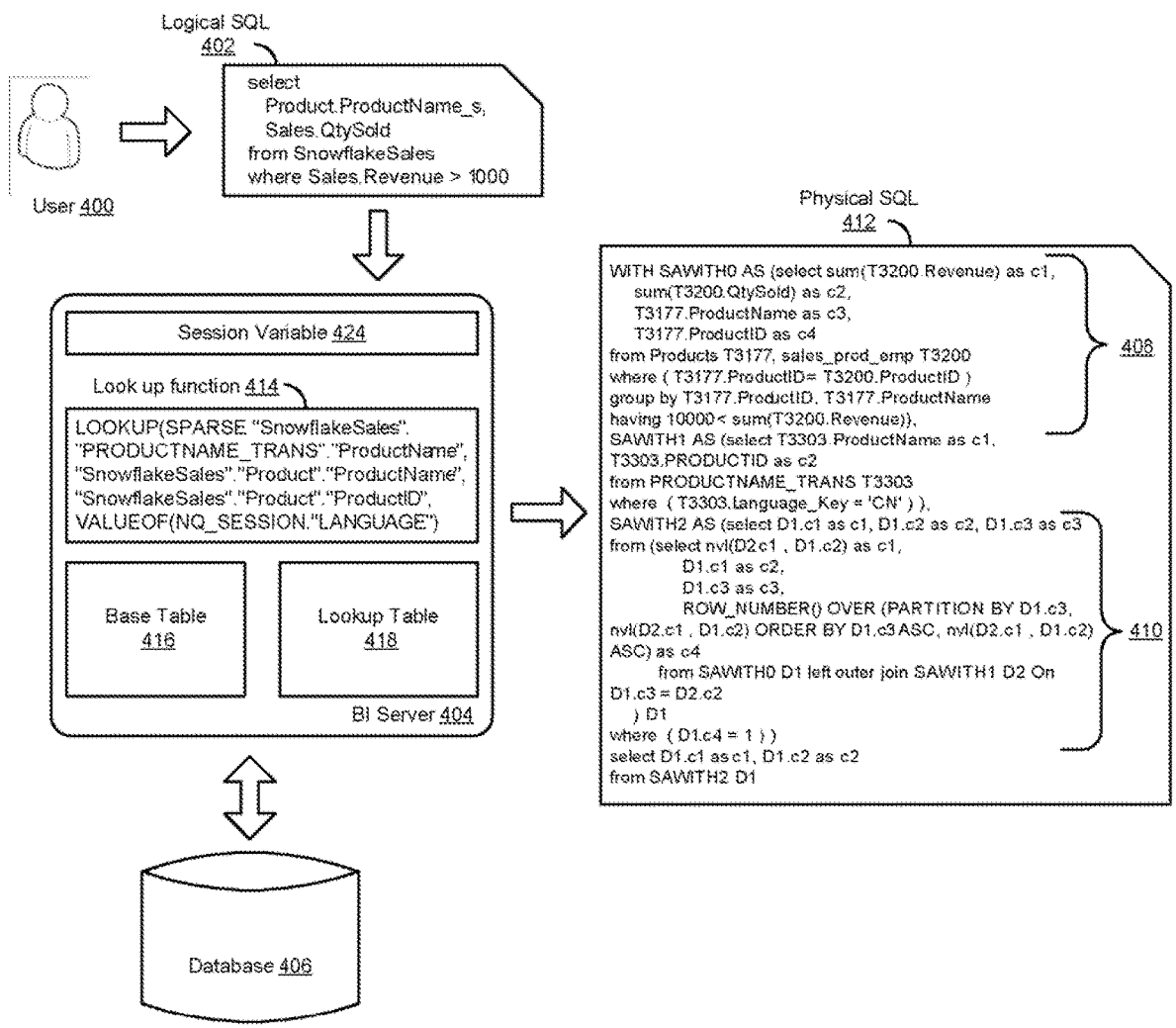
FIG. 4 is an illustration of a business intelligence server employing the lookup table to perform translation of a query, in accordance with various embodiments of the invention.

FIG. 4 is an illustration of a business intelligence server employing the lookup table to perform translation of a query, in accordance with various embodiments of the invention. Although this diagram depicts components as logically separate, such depiction is merely for illustrative purposes. It will be apparent to those skilled in the art that the components portrayed in this figure can be combined or divided into separate software, firmware and/or hardware. Furthermore, it will also be apparent to those skilled in the art that such components, regardless of how they are combined or divided, can execute on the same computing device or can be distributed among different computing devices connected by one or more networks or other suitable communication means.

As illustrated, once a session 424 is established for the user, the user 400 can issue a logical SQL query 402 against the BI server 404. Upon receiving the query 402, the BI server can inspect the session 424 to determine the language of the user's session. If the language is different from the language used to store data in the base table 416, a lookup function 414 can be invoked to translate the values in the base table 416 into the corresponding language of the session.

In accordance with an embodiment, to execute the lookup function 414, the BI server can generate a physical SQL statement 412 that will be executed to obtain the translated value of the data stored in the base table. In accordance with an embodiment, this physical SQL statement 412 can perform a join operation of the base table with the lookup table to obtain the translation. In particular, in the example statement illustrated, the SQL generated by the BI server first performs (step one) a calculation of the Sum(QtySold) 408 and then in step two, joins the lookup table with the result of step one.

In accordance with various embodiments, the BI server can support translated lookup tables. For example, an analytics administrator of the BI server can create a business model on top of a schema that contains data translated into multiple languages. Depending on which language the user specifies when logging in, the user should see query results in his language. If the user logs using a different language and runs the same query again, he should see translated data for the current language.

In accordance with an embodiment, the schema may contain a Product table that contains descriptions in English. The Product table can also contain a language independent code for each language dependent column. For instance, the Category column has a corresponding Category_Code column. Below is an example of the contents of the Product table:

| Product_Table | | | | |
| --- | --- | --- | --- | --- |
| Pro-duct_Key | Pro-duct_Code | Description | Cate-gory_Code | Category |
| 1 | A123 | Bread | D45 | Groceries |
| 2 | B234 | Marmalade | D45 | Groceries |
| 3 | C345 | Milk | D45 | Groceries |

In accordance with an embodiment, the descriptions for other languages can be stored in separate translations tables (lookup tables). Below is an example of the contents of the Product_Translations and Category_Translations tables:

| Product_Translations_Table | | |
| --- | --- | --- |
| Product_Code | Language_Key | Description |
| A123 | DE | Brot |
| A123 | IT | Pane |
| B234 | DE | Marmalade |
| B234 | IT | Marmaleta di agrumi |
| C345 | DE | Milch |
| C345 | IT | Latte |

| Category_Translations_Table | | |
| --- | --- | --- |
| Category_Code | Language_Key | Category |
| D45 | DE | Lebensmittelgeschäft |
| D45 | IT | Drogheria |

In accordance with an embodiment, if the user specifies English when logging in, queries involving the Product table should not join to the translations tables since the base language translations are already present in the Product.Description and Product.Category columns. However, if the user specifies German when logging in, a query referencing the Description logical column should join the Product table with the Product_Translations table to get the translated product descriptions for German. The Product_Translations table must also be filtered to select only the rows with Language_Key='DE'. Likewise the Product table should be joined with the Category_Translations table if the Category logical column is requested. If neither the Description nor the Category is referenced, then the physical SQL statement should not join any translation table.

In accordance with an embodiment, the BI server can support language session variables. For example, a system defined session variable called WEBLANGUAGE can be provided that contains a two-digit ISO language code with an optional two-digit country code in some cases (e.g. zh-tw.) This session variable can be set based on the language selected when the user logs on.

In some cases, the language codes used in the language lookup tables can be different from the values stored in the WEBLANGUAGE session variable. In that case, the administrators can create a new session variable to map the ISO language codes in the WEBLANGUAGE variable to whatever language codes are used in the schema. The administrator would then reference this new session variable when filtering the translation lookup tables.

In accordance with an embodiment, the base language is the default language of a given schema. Frequently, translations in the base language are stored in a different table than the rest of the translations. In accordance with an embodiment, the BI server optimizes queries depending on whether the base language is requested. For instance, if the user's current language is the base language and the base language translations are stored in the base table, then the server should not generate unnecessary joins to the lookup table. On the other hand if the user's current language is not the base language, then the server has no choice but to join to the lookup table to get the translations in the user's language.

In accordance with an embodiment, the BI server allows users to create filters on translated columns. Preferably, any filter on a translated column will be evaluated before aggregation. This means that the translation lookup join would be performed before aggregation. However, in alternative embodiments, the filter may not be evaluated on translated columns before aggregation. Instead, server can try to convert the filter into a sub-query.

In accordance with an embodiment, a lookup table object can be defined by an administrator in the business model of the BI server, which will define the necessary metadata for a translation lookup table. In accordance with one particular embodiment, the lookup table is a logical table with the following special properties:

1) Each lookup table's primary key will be considered as 'Lookup Key' to perform the lookup. In accordance with this particular embodiment, the lookup can only be performed when the values for all lookup key columns are given.
2) The lookup key has a special property comparing to a normal logical table key. The columns of lookup key are order sensitive. i.e. (Product_Code, Language_Key) and (Language_Key, Product_Code) will be considered as two different lookup keys. Order of the lookup key columns can be specified in admintool UI. All columns of the lookup key can be required to be joined in the lookup function.
3) A lookup table has one and only one lookup key.
4) A lookup table has at least one value column. For example, in the Product_Translations_Table previously described, 'Description' is the value column, which is the column containing the actual translation value for product description.
5) There must be functional dependency from Lookup Key to each value column. In other words, lookup key can be used to identify the value column. It also implies that lookup key and value column should both belong to the same physical table.
6) Lookup table can be standalone without joining to any other logical tables.

In accordance with an embodiment, the lookup function can be used in the business mapping layer as part of the expressions of translated logical table columns. In accordance with one particular embodiment, the syntax of the lookup function can be as follows:

```
Lookup ::= LookUp([DENSE] value_column, expression_list ) |
LookUp(SPARSE value_column, base_column, expression_list )
expression_list ::= expr {, expression_list }
expr ::= logical_column | session_variable | literal
```

In accordance with the syntax of the above embodiment, some examples of invoking the lookup function are illustrated below:

```
LOOKUP(SPARSE
SnowflakeSales.ProductName_TRANS.ProductName,
SnowflakeSales.Product.ProductName,
SnowflakeSales.Product.ProductID,
VALUEOF (NQ_SESSION."LANGUAGE"))
LOOKUP(DENSE
SnowflakeSales.ProductName_TRANS.ProductName,
SnowflakeSales.Product.ProductID,
VALUEOF(NQ_SESSION."LANGUAGE"))
```

In accordance with one particular embodiment, the lookup function has the following properties:

1) A Lookup operation is either Dense or Sparse, which can be specified by keyword Dense or Sparse. The default behavior is dense lookup if none Dense or Sparse is given. For Dense lookup, the translation table will be joined to the base table via inner join, while for SPARSE lookup the left outer join will be performed.
2) The first parameter (the parameter after Dense/Sparse keyword) must be a valid value column from a valid lookup table defined in the logical layer.
3) If the Sparse keyword is given, the second parameter must be a column that provides the base value of the value_column. For dense lookup, this base column is not required.
4) The number of expressions in the expression_list should be equal to number of the lookup key columns defined in the lookup table which is defined by value_column. The expression specified in the expression list should also match the lookup key columns one by one following the order. For example, the lookup key for lookup table ProductName_TRANS is (Product_code, Language_Key), the expressions in expression_list are (SnowflakeSales.Product.ProductID, VALUEOF(NQ_SESSION."LANGUAGE")), the meaning of the lookup is: return the translated value of ProductName from translation table with the condition of Product_code=SnowflakeSales.Product.ProductID and Language_Key=VALUEOF(NQ_SESSION."LANGUAGE").

In accordance with an embodiment, the BI server can rewrite the invocation of a lookup function in the late stage of the logical request generation. The table below illustrates one possible but non-limiting SQL generation approach:

SQL Generation

```
Logical request before lookup replacement:
  RqList distinct
  Product.ProductID as c1 GB,
  lookup( SPARSE ProductName_TRANS.ProductName,
  Product.ProductName, Product.ProductID,'CN') as c2
Logical request after lookup replacement:
  RqList distinct
    D1.c1 as c1,
    ifnull(D2.c1 , D1.c4) as c2
    Child Nodes (RqJoinSpec):
```

```
    (
      RqList
        Product.ProductID as c1 GB,
        Product.ProductName as c4
    ) as D1 LeftOuterJoin On D1.c1 = D2.c2
    (
      RqList
        ProductName_TRANS.ProductName as c1,
        ProductName_TRANS.ProductId as c2
        DetailFilter:
          ProductName_TRANS.LANGUAGE_KEY ='CN')
    ) as D2
    The two sub RqList will be navigated separately and placed in the
  master execution tree.
  RqList distinct
    Product.ProductID as c1 GB,
    lookup( DENSE ProductName_TRANS.ProductName,
    Product.ProductID,'CN') as c2
Logical request after lookup replacement:
  RqList distinct
    D1.c1 as c1,
    D2.c1 as c2
    Child Nodes (RqJoinSpec):
    (
      RqList
        Product.ProductID as c1 GB,
        Product.ProductName as c4
    ) as D1 InnerJoin On D1.c1 = D2.c2
    (
      RqList
        ProductName_TRANS.ProductName as c1,
        ProductName_TRANS.ProductId as c2
        DetailFilter:
          ProductName_TRANS.LANGUAGE_KEY ='CN')
) as D2
```

Further details on the SQL generation approach, as well as related materials can be found in U.S. Provisional Patent Application No. 61/349,754 which is incorporated herein by reference in its entirety, including all of the Appendices filed therewith.

Figure 5:
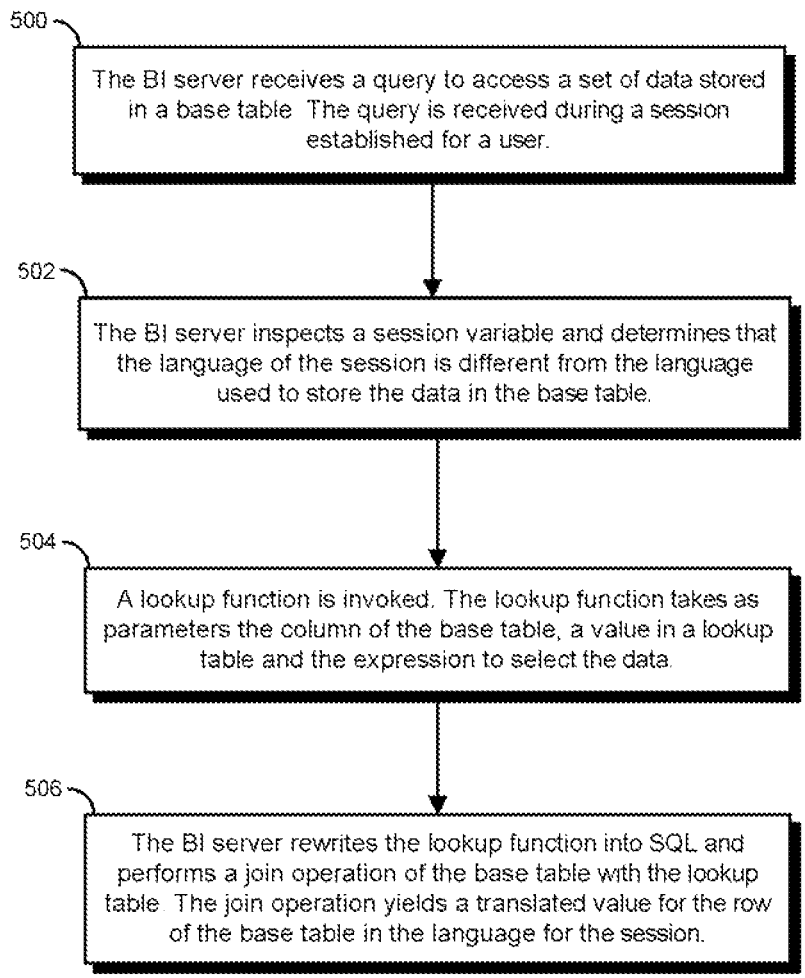
FIG. 5 is a flow chart illustration of the of multilingual support used in a business intelligence server, in accordance with various embodiments of the invention.

FIG. 5 is a flow chart illustration of the multilingual support used in a business intelligence server, in accordance with various embodiments of the invention. Although this figure depicts functional steps in a particular sequence for purposes of illustration, the process is not necessarily limited to this particular order or steps. One skilled in the art will appreciate that the various steps portrayed in this figure can be changed, rearranged, performed in parallel or adapted in various ways. Furthermore, it is to be understood that certain steps or sequences of steps can be added to or omitted from this process, without departing from the spirit and scope of the invention.

As shown in step 500, the BI server receives a query to access a set of data stored in a base table. The query is received during a session established for a user. In step 502, the BI server inspects a session variable and determines that the language of the session is different from the language used to store the data in the base table. If the language is the same as the language used in the base table, no translation or lookup is necessary. If the language is different, however, the lookup function is invoked in step 504. The lookup function takes as parameters the column of the base table, a value in a lookup table and the expression to select the data. In step 506, the BI server rewrites the lookup function into SQL and performs a join operation of the base table with the lookup table. The join operation yields a translated value for the row of the base table in the language for the session.

Throughout the various contexts described in this disclosure, the embodiments of the invention further encompass computer apparatus, computing systems and machine-readable media configured to carry out the foregoing systems and methods. In addition to an embodiment consisting of specifically designed integrated circuits or other electronics, the present invention may be conveniently implemented using a conventional general purpose or a specialized digital computer or microprocessor programmed according to the teachings of the present disclosure, as will be apparent to those skilled in the computer art.

Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art.

The various embodiments include a computer program product which is a storage medium (media) having instructions stored thereon/in which can be used to program a general purpose or specialized computing processor(s)/device(s) to perform any of the features presented herein. The storage medium can include, but is not limited to, one or more of the following: any type of physical media including floppy disks, optical discs, DVDs, CD-ROMs, microdrives, magneto-optical disks, holographic storage, ROMs, RAMs, PRAMS, EPROMs, EEPROMs, DRAMs, VRAMs, flash memory devices, magnetic or optical cards, nanosystems (including molecular memory ICs); and any type of media or device suitable for storing instructions and/or information. The computer program product can be transmitted in whole or in parts and over one or more public and/or private networks wherein the transmission includes instructions which can be used by one or more processors to perform any of the features presented herein. In various embodiments, the transmission may include a plurality of separate transmissions. In one embodiment, the computer readable storage medium is non-transitory.

The foregoing description of the preferred embodiments of the present invention has been provided for purposes of illustration and description. It is not intended to be exhaustive or to limit the invention to the precise forms disclosed. Many modifications and variations can be apparent to the practitioner skilled in the art. Embodiments were chosen and described in order to best explain the principles of the invention and its practical application, thereby enabling others skilled in the relevant art to understand the invention.

What is claimed is:

1. A method for providing multilingual support for querying a set of data in a base table of a relational database, the base table including a base-language column having descriptive words in fields thereof and at least one other column, the descriptive words each being only from a first language, said method comprising:
   receiving an indication that a session has been established for at least one user;
   creating a session variable that specifies a language associated with the session;
   receiving a first database query to access at least a subset of the fields of the column of the base table having descriptive words from the first language, wherein the query is received during the session;
   inspecting the session variable to determine that the language specified by the session variable is a second language, wherein the second language is different from the first language, and wherein a third language is different from the first and the second language;

providing a lookup table including a translated-language column having descriptive words in fields thereof, the descriptive words being only from the second language and from the third language, the key value associated with each field of the translated-language column having descriptive words only from the second language, wherein each row of the lookup table that includes a field having descriptive words only from the second language is related to a respective row in the base table via the key value;

determining, based on the session variable, a key value of the lookup table corresponding to the descriptive words from the first language in the first database query;

determining whether the lookup table is a dense lookup table that contains translations for every record in the base table or a sparse lookup table that contains translations for only a subset of the records in the base table;

if it is determined that the lookup table is a dense lookup table, building a second database query in the structured query language (SQL), the second database query including a filter clause that filters the lookup table based on the key value, and an inner join clause that joins the base table and the lookup table on the base language column and the translated-language column corresponding to the session variable, respectively, and that returns a result table that includes a field of the at least one other column of the base table and the field from the translated-language column of the lookup table whose key value relates to the row of the returned field of the at least one other column of the base table; and if it is determined that the lookup table is a sparse lookup table, building a second database query in the structured query language (SQL), the second database query including a filter clause that filters the lookup table based on the key value, and an outer join clause that joins the base table and the lookup table on the base language column and the translated-language column corresponding to the session variable, respectively, and that returns a result table that includes a field of the at least one other column of the base table and the field from the translated-language column of the lookup table whose key value relates to the row of the returned field of the at least one other column of the base table.

2. The method of claim 1, further comprising:
providing an abstraction layer configured to permit said second database query built in the structured query language (SQL) statement to be operate on a complex federated data source.

3. The method of claim 1 further comprising:
sending the second database query to the database for execution.

4. The method of claim 1, wherein:
the lookup table is a sparse lookup table that contains translations for only a subset of the records in the base table; and
said join clause is an outer join of the base table with the lookup table, wherein the rows from the base table are preserved.

5. The method of claim 1, wherein:
the lookup table is both a dense and sparse lookup table that contains complete translations of at least one particular field of the base table but contains only partial translation of at least one other field of the base table; and
designating a property of a lookup operation to specify one of: sparse or dense, wherein a sparse lookup joins the base table with the lookup table via an outer join clause, and wherein a dense lookup joins the base table with the lookup table via an inner join clause.

6. The method of claim 1, wherein a separate lookup table is implemented per each base table and wherein the lookup table contains a foreign key reference to records in the base table.

7. The method of claim 1, wherein a separate lookup table is implemented per each field of the base table.

8. The method of claim 1, wherein a business intelligence (BI) server implements a schema that contains data translated into multiple languages, and wherein depending on which language is associated with a user upon logging in, the queries are filtered according to said language by employing the lookup table.

9. A system for providing multilingual support in a data querying and processing environment, said system comprising:
a data source storing a set of data wherein the set of data is stored in a base table, the base table including a base-language column having descriptive words in fields thereof and at least one other column, the descriptive words each being only from a first language; and
a business intelligence (BI) server that executes on one or more microprocessor, wherein the BI server is configured to
receive an indication that a session has been established, wherein said session is established to query a set of data in the base table;
wherein when the session is established a session variable is created that specifies a language associated with the session;
receive a first database query to access at least a subset of the fields of the column of the base table having descriptive words from the first language, wherein the query is received during the session;
inspect the session variable to determine that the language specified by the session variable is a second language, wherein the second language is different from the first language, and wherein a third language is different from the first and the second language;
provide a lookup table including a translated-language column having descriptive words in fields thereof, the descriptive words being only from the second language and from the third language, the key value associated with each field of the translated-language column having descriptive words only from the second language, wherein each row of the lookup table that includes a field having descriptive words only from the second language is related to a respective row in the base table via the key value;
determine, based on the session variable, a key value of the lookup table corresponding to the descriptive words from the first language in the first database query;
determine whether the lookup table is a dense lookup table that contains translations for every record in the base table or a sparse lookup table that contains translations for only a subset of the records in the base table;
if it is determined that the lookup table is a dense lookup table, build a second database query in the structured query language (SQL), the second database query including a filter clause that filters the lookup table based on the key value, and an inner join clause that joins the base table and the lookup table on the base language column and the translated-language column corresponding to the session variable, respectively, and that returns a result table that includes a field of the at least one other column of the base table and the field from the translated-language column of the lookup table whose key value relates to the row of the returned field of the at least one other column of the base table;

if it is determined that the lookup table is a sparse lookup table, build a second database query in the structured query language (SQL), the second database query including a filter clause that filters the lookup table based on the key value, and an outer join clause that joins the base table and the lookup table on the base language column and the translated-language column corresponding to the session variable, respectively, and that returns a result table that includes a field of the at least one other column of the base table and the field from the translated-language column of the lookup table whose key value relates to the row of the returned field of the at least one other column of the base table; and send the second database query to the data source for execution.

10. The system of claim 9, further comprising:

an abstraction layer configured to permit said second database query built in the structured query language (SQL) statement to be operate on a complex federated data source.

11. The system of claim 9, wherein:

the lookup table is a dense lookup table that contains translations for every record in the base table.

12. The system of claim 9, wherein: the lookup table is a sparse lookup table that contains translations for only a subset of the records in the base table.

13. The system of claim 9, wherein:

the lookup table is both a dense and sparse lookup table that contains complete translations of at least one particular field of the base table but contains only partial translation of at least one other field of the base table; and wherein the BI server is further configured to designate a property of a lookup operation to specify one of: sparse or dense, wherein a sparse lookup joins the base table with the lookup table via an outer join clause, and wherein a dense lookup joins the base table with the lookup table via an inner join clause.

14. The system of claim 9, wherein a separate lookup table is implemented per each base table and wherein the lookup table contains a foreign key reference to records in the base table.

15. The system of claim 9, wherein a separate lookup table is implemented per each field of the base table.

16. The system of claim 9, wherein the business intelligence (BI) server implements a schema that contains data translated into multiple languages, and wherein depending on which language is associated with a user upon logging in, the queries are filtered according to said language by employing the lookup table.

17. A non-transitory computer-readable storage medium storing a set of instructions for providing multilingual support for querying a set of data in a base table of a relational database, the base table including a base-language column having descriptive words in fields thereof and at least one other column, the descriptive words each being only from a first language, which instructions, when executed by one or more microprocessors, cause the one or more microprocessors to perform steps comprising:

receiving an indication that a session has been established for at least one user;

creating a session variable that specifies a language associated with the session;

receiving a first database query to access at least a subset of the fields of the column of the base table having descriptive words from the first language, wherein the query is received during the session;

inspecting the session variable to determine that the language specified by the session variable is a second language, wherein the second language is different from the first language, and wherein a third language is different from the first and the second language;

providing a lookup table including a translated-language column having descriptive words in fields thereof, the descriptive words being only from the second language and from the third language, the key value associated with each field of the translated-language column having descriptive words only from the second language, wherein each row of the lookup table that includes a field having descriptive words only from the second language is related to a respective row in the base table via the key value;

determining, based on the session variable, a key value of the lookup table corresponding to the descriptive words from the first language in the first database query; and determining whether the lookup table is a dense lookup table that contains translations for every record in the base table or a sparse lookup table that contains translations for only a subset of the records in the base table;

if it is determined that the lookup table is a dense lookup table, building a second database query in the structured query language (SQL), the second database query including a filter clause that filters the lookup table based on the key value, and an inner join clause that joins the base table and the lookup table on the base language column and the translated-language column corresponding to the session variable, respectively, and that returns a result table that includes a field of the at least one other column of the base table and the field from the translated-language column of the lookup table whose key value relates to the row of the returned field of the at least one other column of the base table; and if it is determined that the lookup table is a sparse lookup table, building a second database query in the structured query language (SQL), the second database query including a filter clause that filters the lookup table based on the key value, and an outer join clause that joins the base table and the lookup table on the base language column and the translated-language column corresponding to the session variable, respectively, and that returns a result table that includes a field of the at least one other column of the base table and the field from the translated-language column of the lookup table whose key value relates to the row of the returned field of the at least one other column of the base table.

* * * * *